(12) United States Patent
Liao et al.

(10) Patent No.: US 7,865,141 B2
(45) Date of Patent: Jan. 4, 2011

(54) CHIPSET FOR MOBILE WALLET SYSTEM

(75) Inventors: Dave Ta-Wu Liao, Saratoga, CA (US);
Steven Donald Edelson, Saratoga, CA (US)

(73) Assignee: Silicon Storage Technology, Inc., Sunnyvale, CA (US)

( * ) Notice: Subject to any disclaimer, the term of this patent is extended or adjusted under 35 U.S.C. 154(b) by 874 days.

(21) Appl. No.: 11/808,151

(22) Filed: Jun. 7, 2007

(65) Prior Publication Data

US 2007/0293155 A1   Dec. 20, 2007

Related U.S. Application Data

(60) Provisional application No. 60/813,440, filed on Jun. 15, 2006.

(51) Int. Cl.
*H04B 7/00* (2006.01)

(52) U.S. Cl. .................. 455/41.2; 455/558; 455/434.1; 455/574; 235/439; 235/441; 235/492

(58) Field of Classification Search ............... 455/41.2, 455/558, 574, 343.1
See application file for complete search history.

(56) References Cited

U.S. PATENT DOCUMENTS

| 6,776,339 | B2* | 8/2004 | Piikivi | 235/451 |
| 7,200,420 | B2* | 4/2007 | Rankin | 455/558 |
| 7,520,438 | B2* | 4/2009 | Kim et al. | 235/492 |
| 2005/0274803 | A1* | 12/2005 | Lee | 235/439 |

* cited by examiner

*Primary Examiner*—Charles N Appiah
*Assistant Examiner*—Michael T Vu
(74) *Attorney, Agent, or Firm*—DLA Piper LLP (US)

(57) ABSTRACT

The invention presents a chipset for a mobile wallet system in a communication terminal having a SIM socket and a RFID antenna. The chipset includes a wallet module and a controller module. The wallet module has a contactless interface port coupled to the RFID antenna and a wallet memory for storing wallet applications. The controller module, connected to the SIM socket of the communication terminal, has a controller memory stored with SIM function software, mobile wallet application software and software to control the wallet module. The controller module is powered through the SIM socket, and the wallet module is powered through the SIM socket and the RFID antenna.

15 Claims, 7 Drawing Sheets

US 7,865,141 B2

CHIPSET FOR MOBILE WALLET SYSTEM

CROSS REFERENCE TO RELATED APPLICATION

The present application is related to and claims the benefit of priority of the provisional application: application Ser. No. 60/813,440 filed on Jun. 15, 2006, entitled "Method and apparatus for mobile wallet chip set and system", of which the present application is a non-provisional application thereof. The disclosure of the foregoing application is hereby incorporated by reference in its entirety, including any appendices or attachments thereof, for all purposes.

FIELD OF THE INVENTION

The present invention relates to a chipset for a mobile wallet system, and more particularly, to a chipset implemented into a SIM card in a communication terminal, e.g., a mobile phone, in communication with a contactless reader.

BACKGROUND OF THE INVENTION

The mobile phone industry has been trying to implement mobile wallet functions into mobile phones for the last few years. The most well-known is the i-mode® mobile wallet of NTT DoCoMo implemented by a Sony Felica® contactless IC soldered onto the motherboard of NTT's 3G mobile phones. Other approaches include using Philips NFC (Near Field Communication) IC or Infra-Red port. All these approaches have suffered from high entry cost because a new phone must be obtained to acquire the mobile wallet functions. It is more cost effective to implement mobile wallet functions on a SIM card which cost much less than purchasing a new phone.

FIG. 1 shows an implementation of a NFC phone which is being adopted in France in 2007 to implement mobile wallet functions. A NFC chip 22 resides in a NFC phone 20 provided with a contactless interface attached with 13.5 Mhz RFID antenna 23. The NFC chip 22 provides two serial communication channels. One is to communicate with a SIM card 21 to retrieve authorization to enable the contactless interface and to work with mobile wallet applets that installed in the SIM card 21. The other is a standard asynchronous UART channel to a mobile phone CPU chip 24. This NFC chip 22 can not be built into the SIM card 21 because it requires many passive components and it has many more I/O pins than that are available on the SIM card 21 (there is actually only one I/O pin available). Mobile wallet users in France usually have to purchase a new NFC phone in order to acquire the mobile wallet function.

Recent solution for the mobile wallet functions in the industry have been devised by utilizing existing dual interface smart card IC chip provided with both contact and contactless ports, such as the Philips® Combi chips. These IC chips have two major problems. First, the Combi or dual interface IC chips are traditionally employed for banking cards specifying small non-volatile memory (typically EEPROM), while the SIM cards need a much larger memory capacity which are beginning to be built by state-of-art flash memory technology. Second, currently available dual interface IC chip can not have contact port (CM) and contactless port (CL) operating simultaneously. But this concurrent operation is required for a mobile wallet to work in SIM socket in mobile phones. Besides, the conventional Combi chips are limited to a low speed CPU and a small non-volatile memory because it has to operate under the low power limit imposed through the CL port. The above-mentioned problems are primary issues for a mobile wallet module to work within a SIM socket in mobile phones.

There have been a few patent applications regarding mobile wallet applications for payment or ticketing, such as U.S. Pat. No. 7,114,179 entitled "Method and system for ordering, loading and using access tickets" describes a ticket system wherein tickets are downloaded into SIM card memory module and a contactless interface in mobile phone is used to send ticket to access controlled device. U.S. Pub. No. 2002/0177407 as illustrated in FIG. 2 is a block diagram showing a configuration of a dual interface IC card for a portable telephone. This IC card 30 comprises a memory for storing information of electronic tickets or service points, a CPU (Central Processing Unit) for performing interface control with respect to the external and access control to the memory and the like. Furthermore, the IC card 30 is provided with an antenna 31, a contactless type I/F (interface) portion 32, a physical contact 33 and the like. The antenna 31 performs transmission/reception of data regarding use of an electronic ticket or the like with an external system, that is, a contactless reader (not shown) via a radio link R2 for IC card, namely RFID, and is intended to realize a contactless type interface. The contactless type I/F portion 32 provides an interface of data transmission/reception using the antenna 31. On the other hand, the contact 33 is electrically connected with a contact (not shown) of a portable telephone set 10, and intended to realize a contact type interface. In this way, the IC card 30 has both of the function as a contactless type IC card and the function as a contact type IC card. In other words, it is just like typical dual interface smart cards that are commonly in use these days. U.S. Pub. No. 2002/0177407 basically describes the idea of the placement of a dual interface IC card into a mobile phone. It failed to address any of the technical difficulties that must be solved to make a real world implementation.

As discussed above, the idea of SIM card added with contactless interface have been described many times, while most of the prior efforts are vague conceptual designs. None of them reveal practical real world implementation, let alone a mass produced solution that is achieved by the chipset in this invention. On account of the problem the prior art brought about, there is a resulting need for a chipset to cope with the above-mentioned problems. The present invention introduces an optimized chipset enabling immediate widespread usage by implementing the chipset having a wallet module in a SIM (Subscriber Identity Module) card that conforms to GSM11-11 form factor, including a 2G GSM SIM card, a 3G USIM (Universal SIM) card, a CDMA (Code Division Multiple Access) RUIM (Removable User Identity Module) card, a China PHS (Personal Handy-phone System) SIM card, or other mobile communication ID cards. Unlike the existing phone based solutions, the present chipset provides a simple, cost-effective solution, while is applicable to all kinds of mobile phones.

SUMMARY OF THE INVENTION

In light of the prior art limited by the above problems, it is an object of the present invention to provide a chipset for applications in a mobile wallet system which is implemented into a SIM card.

In accordance with an aspect of the present invention, a chipset is designed for a mobile wallet system in a communication terminal having a SIM socket and a RFID antenna in communication with a contactless reader. The chipset includes a wallet module and a controller module. The wallet module contains a contactless interface port coupled to the RFID antenna, a serial port coupled to the controller module, and a wallet memory for storing wallet applications, including e-purse balances, electronic tickets, and keys, ID's, etc. The controller module has a first serial port connected to the SIM socket of the communication terminal, a second serial port coupled to the wallet module, and a controller memory stored with SIM function software, mobile wallet application software and software to control the wallet module. The controller module is powered through the SIM socket, while the wallet module is powered through the SIM socket and the RFID antenna.

Preferably, the wallet module further contains a first I/O buffer receiving commands from the controller module, a second I/O buffer for holding the commands from the contactless reader, a command arbitration module for selecting between the first I/O buffer and the second I/O buffer, an authentication and encryption module for securing communication with the contactless reader and the controller module, and a command execution module for performing various operations in accordance with the commands. All modules mentioned above are implemented in hardwired logic to achieve small chip size and low cost.

Preferably, the wallet module further contains a by-pass unit implemented in hardwired logic for decoding the commands from the contactless reader. The decoding decision is to route the commands to the second I/O buffer for execution inside the wallet module, or to the serial port of the wallet module for transmission to the controller module for command execution.

Typically, the wallet memory of the wallet module has a capacity of 1 KB divided into 16 sectors.

Alternatively, the wallet memory of the wallet module has a capacity of 4 KB divided into 64 sectors.

Preferably, the controller memory has a capacity ranging from 64 KB to 1 MB.

Preferably, the wallet module includes the wallet memory having a capacity many times of a standard Mifare® chip which is either 1 KB or 4 KB.

Preferably, the wallet memory is divided into a plurality of banks. Each bank has a capacity of 1 KB or 4 KB corresponding to one Mifare® chip.

Preferably, the wallet module further includes a non-volatile register which can be loaded with a bank index by the controller module and used for selecting an active bank. The active bank of the wallet memory is accessible by the contactless reader.

Preferably, the wallet module as well as the controller module support standard contactless protocols. Certainly, the mobile wallet system comprises mobile communication ID cards that conform to GSM11-11 standard form factor, including a GSM SIM (Subscriber Identity Module) card, a GSM USIM (Universal SIM) card, a CDMA (Code Division Multiple Access) RUIM (Removable User Identity Module) card, and a PHS (Personal Handy-phone System) SIM card.

In accordance with a further aspect of the present invention, the wallet module is not a dedicated hardwired logic implementation. Instead, functions of the wallet module are implemented by software codes executed on a programmable controller. In this manner, a standard off the shelf dual interface chip or a Combi chip can be utilized to implement the wallet module.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF THE PREFERRED EMBODIMENTS

The present invention discloses a chipset for a mobile wallet system, and the objects and advantages of the present invention will become more readily apparent to those ordinarily skilled in the art after reviewing the following detailed description. The present invention needs not be limited to the following embodiments.

Figure 1:
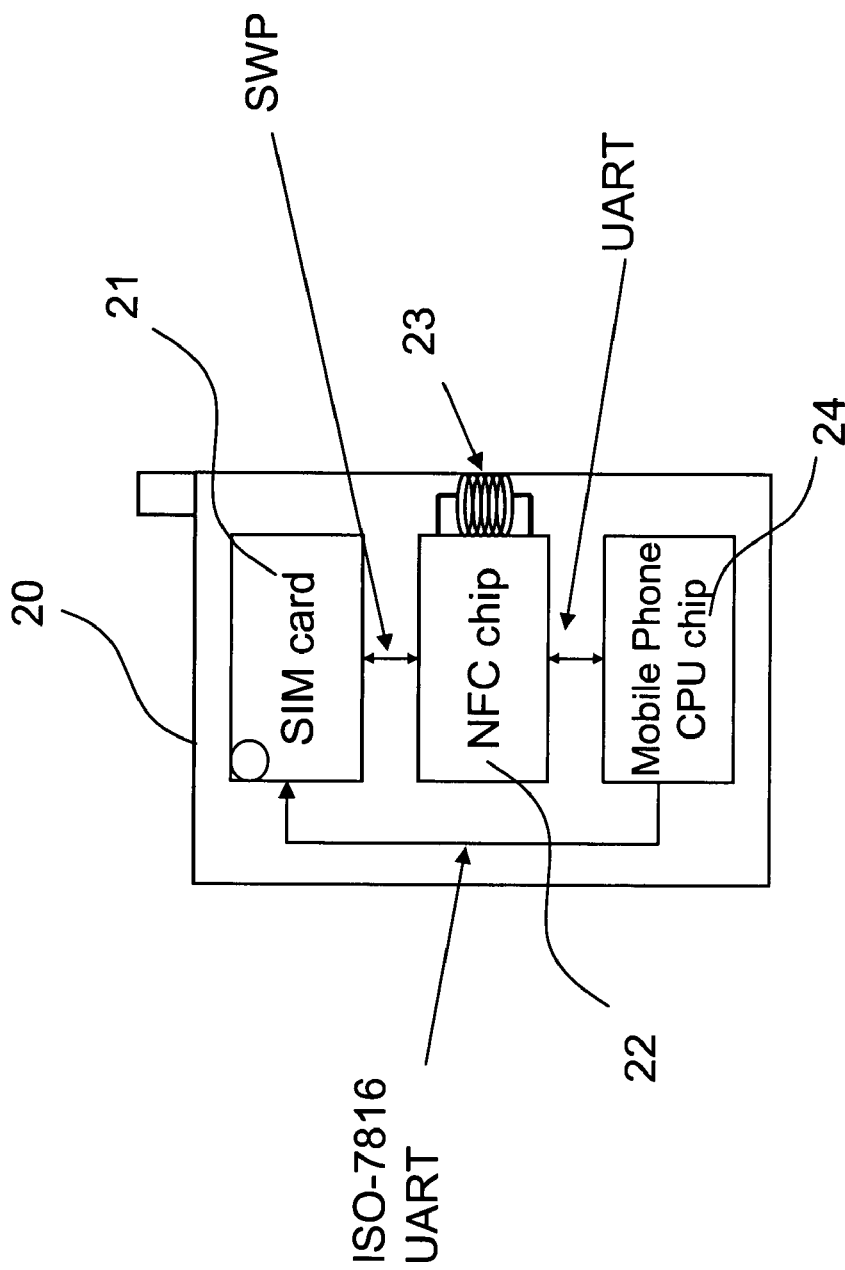
FIG. 1 is a schematic diagram of a NFC phone according to the prior art.
Figure 2:
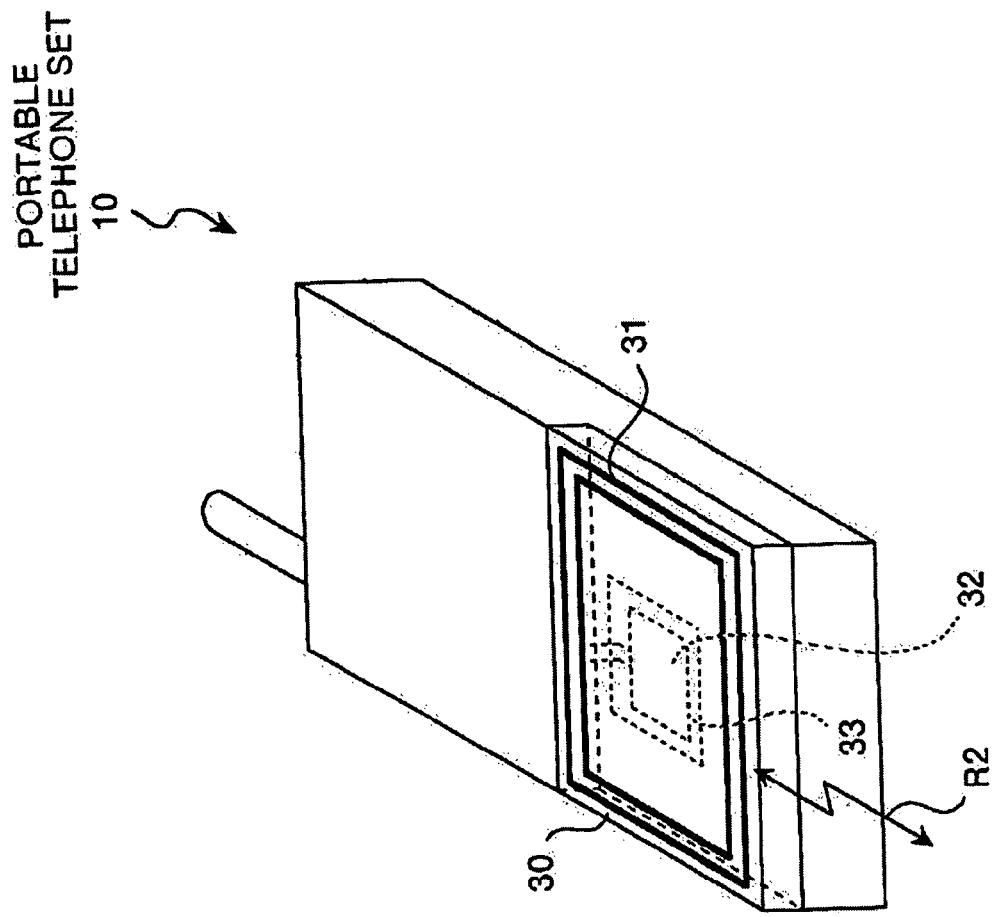
FIG. 2 is a block diagram showing a configuration of an IC card for a portable telephone according to the prior art.
Figure 3:
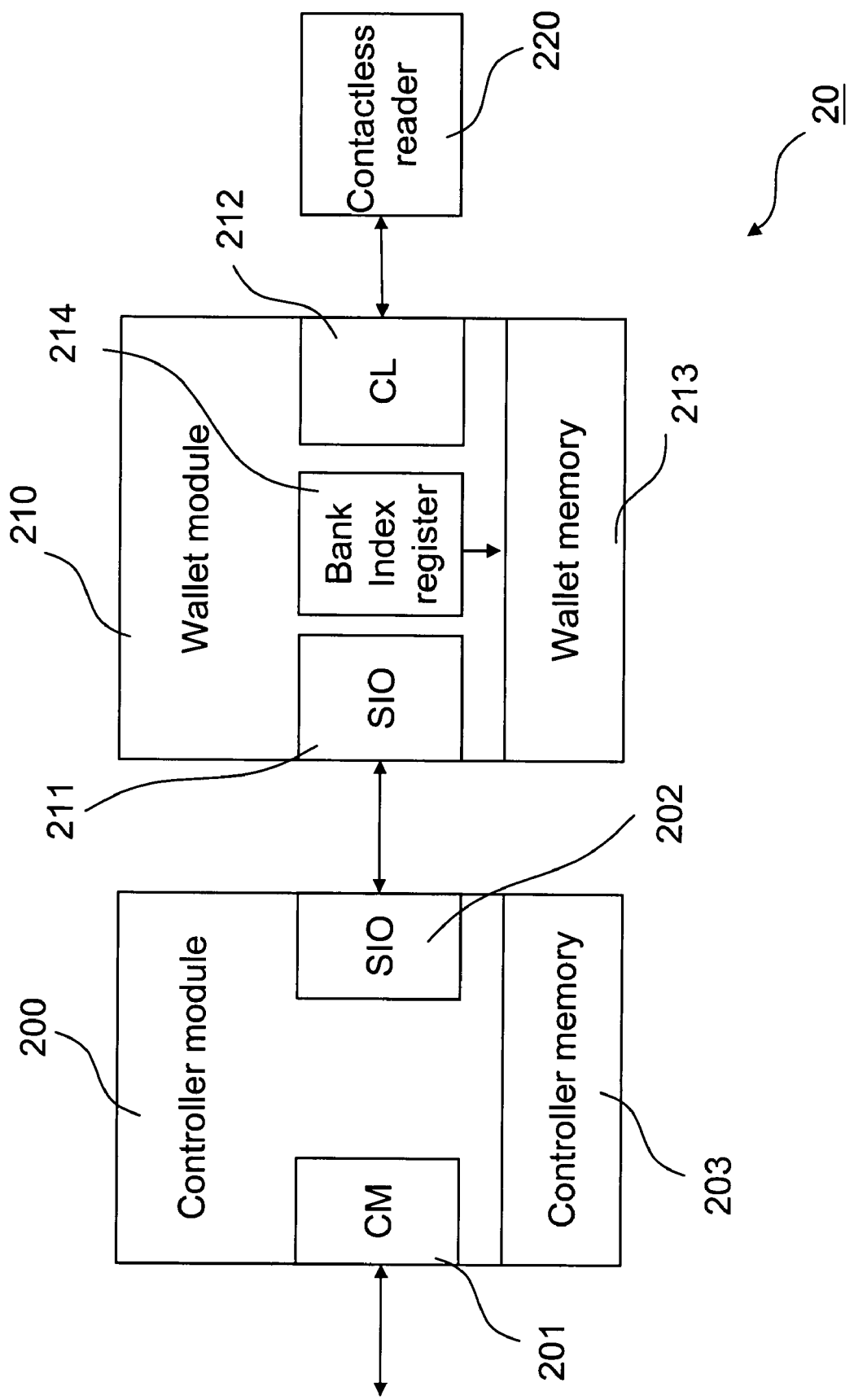
FIG. 3 illustrates a preferred architecture of a chipset according to the present invention.

Please refer to FIG. 3. It illustrates a preferred architecture of a chipset for a mobile wallet system in a mobile phone according to the present invention. As shown in FIG. 3, the chipset 20 in communication with a contactless reader 220 contains a controller module 200 and a wallet module 210 in the case of a two-chip chipset solution. Alternatively, the controller module 200 and the wallet module 210 can be integrated into a single IC chip. The controller module 200 has a contact (CM) port 201, a serial I/O port (hereinafter referred to as "SIO") 202, and a controller memory 203, typically in the range of 64 KB to 1 MB for storing SIM function software, mobile wallet application software and software for controlling the wallet module 210. The CM port 201, normally a standard ISO-7816 UART interface, which is coupled to a SIM socket (not shown) in the mobile phone. Likewise, the wallet module 210 has a SIO port 211, a contactless (CL) port 212, and a wallet memory 213 to store wallet applications, including account balance, purses, tickets, keys, etc. The interconnection between the controller module 200 and the wallet module 210 is accomplished by the SIO ports 202 and 211, which can be realized by ISO-7816 UART or SPI (Serial Peripheral Interface), or other similar serial I/O channels; while the CL port 212 is coupled to a RFID antenna (not shown) for communication with a contactless reader 220.

An important aspect of the present invention is how the chipset modules are powered. The conventional Combi chip controller is powered by both a SIM socket of a mobile phone and an RFID antenna attached therewith, while the controller module 200 is powered through the SIM socket only, which suggests that the controller module 200 operate on the power supplied by mobile phone battery. The power supply from the phone battery is sufficient to support the power consumption requirement for a large memory (1 MB likely), and a high performance controller containing 32 bit CPU needed for state of art SIM software. The controller of conventional Combi chip must be limited to low speed 8 bit CPU and small memory because it has to work under extremely low power supplied by the RFID antenna. For better results, the wallet module 210 is powered through the SIM socket and the RFID antenna. Besides, the wallet module 210 can communicate with the contactless reader 220 even when the SIM socket is not powered, i.e., the mobile phone is turned off or runs out of battery. This is an important usage factor because the mobile wallet module must be usable even when the mobile phone battery runs out or the controller module doesn't function. A further advantage is that the RFID antenna current drain is quite low since it only needs to supply power to the wallet module 210. Accordingly, much longer reading distance from contactless reader 220 is made possible in contactless applications.

The wallet memory 213 of the wallet module 210 may have a capacity ranging from 1 KB to 4 KB consisting of sectors of 64 bytes for storing wallet applications. Typically, memory capacity and data storage format of each sector is made the same as that defined in the Mifare® chip which sets the industry standard for contactless smart card applications. Alternatively, the wallet memory 213 has a capacity of 16 KB to 64 KB, so it can be further partitioned into 16 banks, for example. Capacity of each bank corresponds to that of one Mifare® chip. Therefore, the wallet module 210 can keep the data of 16 Mifare® chips which may represent transit fare cards for 16 different cities. As illustrated, a bank index register 214 in the wallet module 210 is stored with bank indexes written by the controller module 200 to select an active bank out of the 16 banks, and the selected bank can be accessed by the contactless reader 220. Values of the bank indexes within the bank index register 214 are non-volatile so as to persist if the phone power is not available.

In this embodiment, the serial interconnection as described above enables command execution and data flow between the controller module 200 and the wallet module 210 to realize mobile wallet applications. The wallet memory 213, where the wallet applications data are securely stored, allows commands and data flow from the contactless reader 220, the mobile phone, and mobile network through the controller module 200. For example, in a transit fare card application, an account is stored in the wallet memory 213 of the wallet module 210. The contactless reader 220 in a train station request access to the wallet module 210 by way of the CL port 212 to deduct train fare from the account stored in the wallet memory 213. The mobile wallet application software running on the controller module 200 displays a set of menus on the phone screen. One menu is to display balance of the account which is obtained by the controller module 200 by sending a command through the SIO ports 202 and 211 to retrieve the account balance out of the wallet module 210. Another menu may display recharge option wherein the controller module 200 first use GSM network communication channel by way of the CM port 201 to obtain authorization from a banking server to withdraw money from a bank account, and the money is credited to the account in the wallet memory 213 by sending an "Add" command to the wallet module 210.

Figure 4:
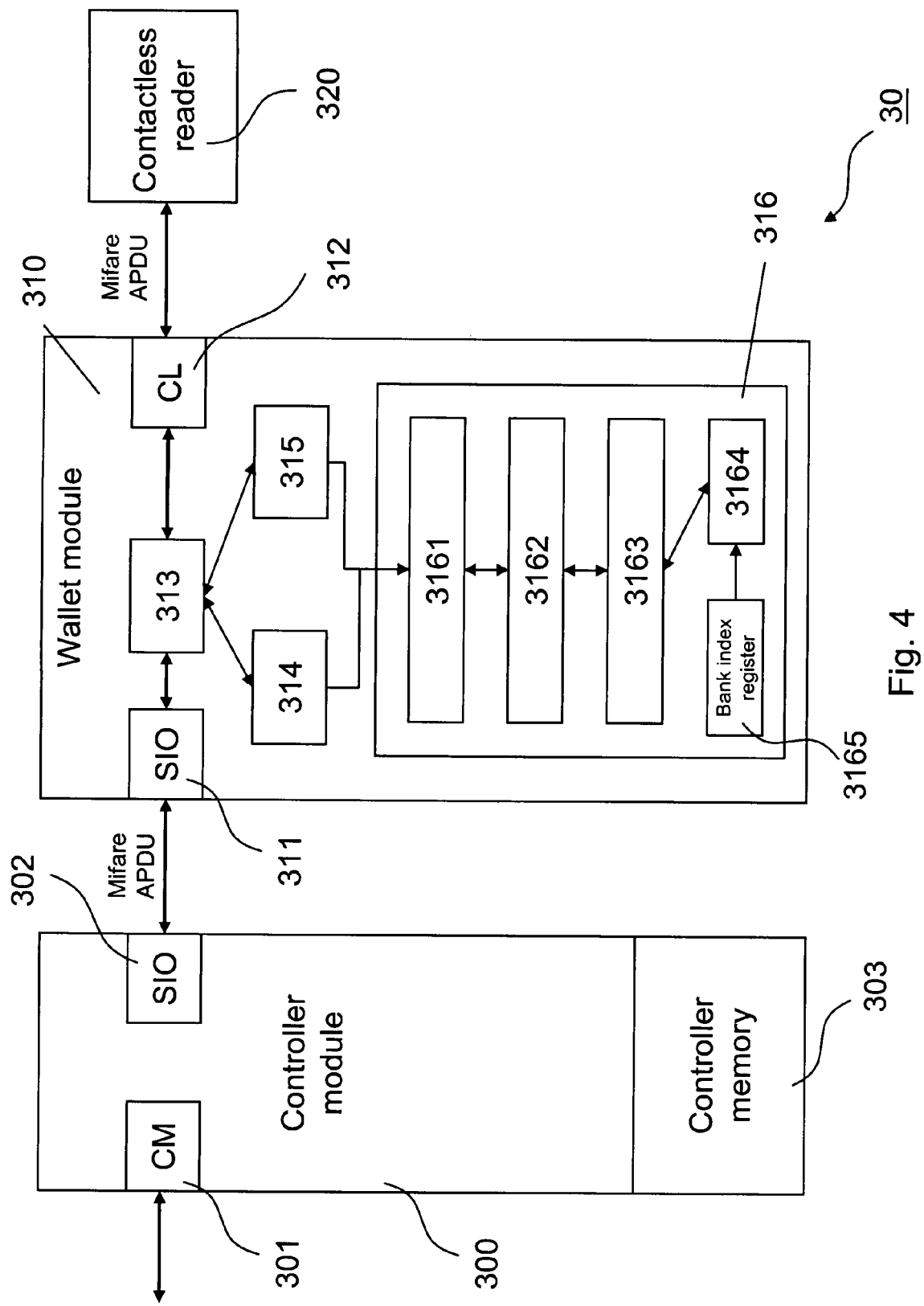
FIG. 4 illustrates an architecture of an optimized chipset according to the present invention, shows detailed block diagram.

Please refer to FIG. 4. It illustrates an optimized chipset in communication with a contactless reader according to the present invention. The chipset 30 includes a controller module 300 and a wallet module 310 in communication with a contactless reader 320. The controller module 300 has a CM port 301 coupled to a SIM socket of a mobile phone, a SIO 302 for communicating with the wallet module 310, and a controller memory 303 stored with SIM function software, mobile wallet application software and software to control the wallet module 310. The wallet module 310 is a dual interface module equipped with a SIO port 311 and a CL port 312 that support industry standard contactless protocols transmitted via interfaces like the Mifare® (ISO-14443 type A), Felica, ISO-14443 type B, and the like. The protocols are transmitted by means of APDU (Application Protocol Data Unit) or data-command packet. A by-pass unit 313 is provided to route the packet-oriented protocols or command packets from the SIO 311 and the CL port 312. The commands from the SIO port 311 are always delivered to a CM I/O buffer 314; while commands received from the CL port 312 are sent to a CL I/O buffer 315 when the commands are intended for execution inside the wallet module.

The core of the wallet module 310 is a WPU (Wallet Processing Unit) 316. The WPU 316 includes a command arbitrator 3161 to select the commands between the CM I/O buffer 314 and the CL I/O buffer 315, an authentication/encryption unit 3162 for authenticating and encrypting the selected commands to secure communication, a command execution unit 3163 that executes a set of commands that operate on wallet applications data (purse, ticket, or keys) kept in a wallet memory 3164, and a bank index register 3165 stored with bank indexes written by the controller module 300. Typically, a set of commands specific to the standard contactless protocols are defined for command execution of the WPU 316 or Mifare® chip, including read/write, increment, decrement, and the like. In this embodiment, hardwired logic is utilized to implement operations described above so as to achieve a smallest chip size, low cost and low power consumption.

Whenever an incoming command from the CL port 312 is not included in the defined set of commands for the WPU 316, the command is routed to the controller module 300 by the by-pass unit 313 through the SIO port 311 for command execution. Otherwise, the incoming command is executed in the WPU 316. The by-pass unit 313 features allowing new applications with new commands to be installed on the contactless reader 320. A corresponding new wallet application program can be downloaded into the controller module 300 to process these new commands sent from the contactless reader 320. Therefore, the set of commands is made extensible by the by-pass unit 313.

In practice, the controller module 300 sends the wallet module 310 the defined command set specific to the contactless protocols coming from the contactless reader 320 through the CL port 312. These commands provide encryption and authentication supports for securing the communication between the controller module 300 and the wallet module 310. Any attack by probing the commands transmission of these two modules therebetween are made useless. A further advantage is that having both the SIO 311 and CL 312 ports running the same command set allows one circuit in WPU 316 to execute commands from both ports and greatly reduce the circuit size. Therefore, the controller module 300 behaves like the contactless reader 320 by communicating to the wallet module 310 with the set of commands specific to the contactless protocol from the contactless reader 320. Namely, the controller module 300 sends the same contactless protocol commands via APDU packets to the wallet module 310 as the contactless reader 320 sending these APDU packets through the air with ISO-14443 physical layer modulation protocol. The APDUs are sent from the controller module 300 by way of SIO 302 to the SIO port 311. The SIO 302 can be a standard ISO7816 smart card UART (Universal Asynchronous Receiver Transmitter) port or simply a serial I/O channel like SPI. Alternatively, the SIO 302 can be substituted with an on-chip PIO (parallel I/O port) for APDU transmission in case that the controller module 300 and the wallet module 310 are on one single chip. The novel feature is that the contactless protocol APDUs are now transmitted by way of "contact mode" port by the controller module 300. In other words, the controller module 300 behaves like the contactless reader 320, and the wallet module 310 actually works with two readers: one is the contactless reader 320, and the other is the controller module 300.

Figure 5:
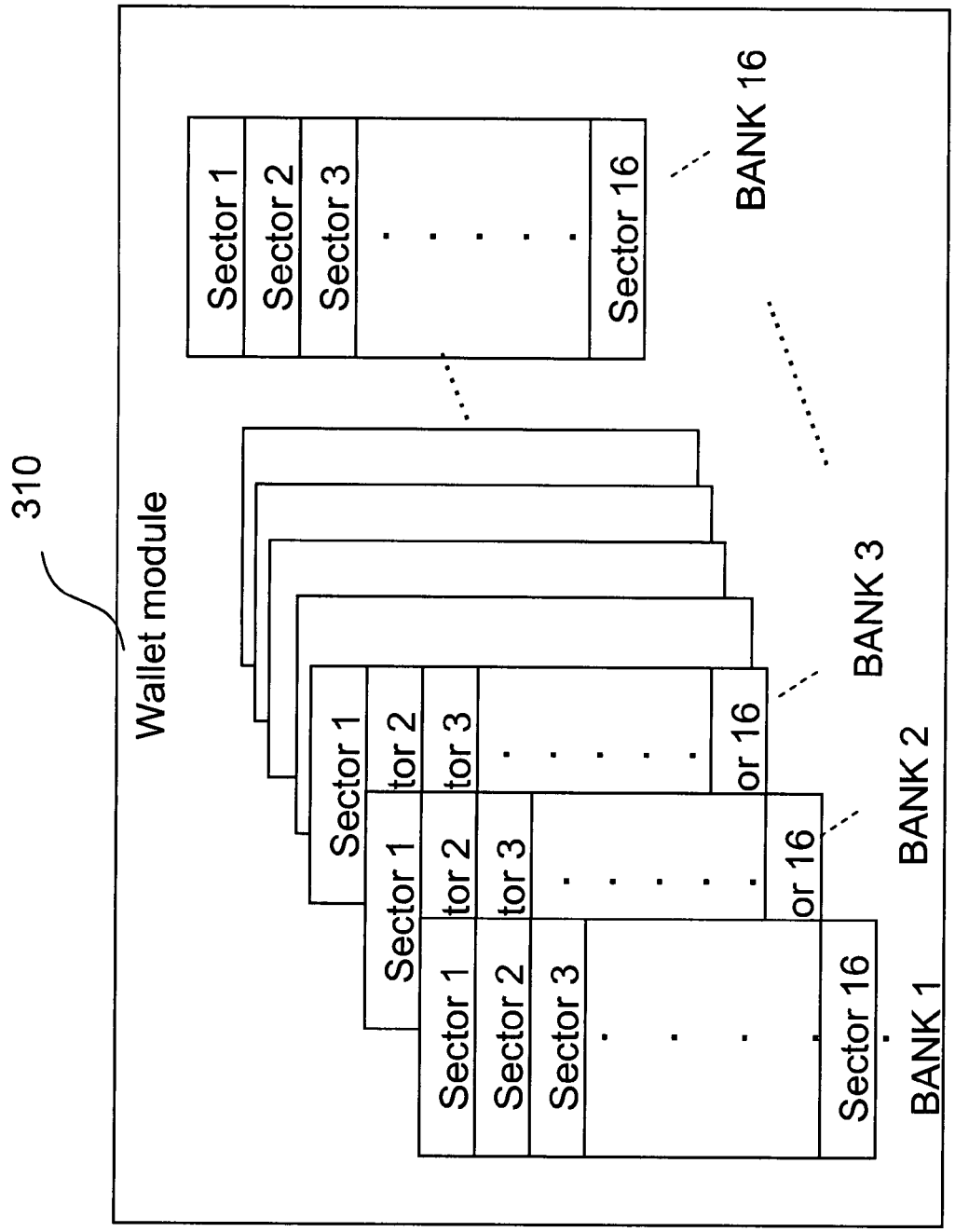
FIG. 5 illustrates a bank switching architecture of a memory in the wallet module according to the present invention.

Philips Mifare® chip is applied in the majority of today's transit fare cards, and has a 1 KB non-volatile memory divided into 16 sectors of 64 bytes each for storing wallet application associated information. Many applications may occupy several sectors, which leads to sector usage conflicts between different applications. FIG. 5 illustrates a bank switching architecture for keeping multiple wallets with conflicting sector usage. A large non-volatile memory is provided for the wallet module 310. The large non-volatile memory has a capacity capable of holding the wallet applications data of multiple standard wallet chips, such as the standard 1 KB or 4 KB Mifare® chip. The large non-volatile memory is divided into several banks, 16 banks for instance. A single bank's capacity equals to the entire memory capacity of a standard wallet chip. Namely, each bank represents a single transit fare card as implemented in a standard Mifare chip. Under control of the controller module 300 in FIG. 4, one of the 16 banks is selected as an active bank while the others are inactive. The active bank receives commands from the command execution unit 3163 and the data therein is accessed or updated. The bank selection can be accomplished via I/O pins (not shown) on the wallet module 310, or the bank index register 3165 stored with bank indexes. Value of the bank indexes is written by the controller module 300 and is non-volatile so as to persist whenever the phone is off.

Many Mifare® based applications with conflicting sector assignments can co-exist in the present chipset. The multiple bank features can be very useful in real life. For example, a mobile wallet user may keep several often-visited cities' transit fare cards in his mobile phone, which is equipped with the present chipset. He can select the fare card for the city which he has just arrived. The controller module 300 writes value of the bank index corresponding to the selected city fare card into the bank index register 3165.

Figure 6:
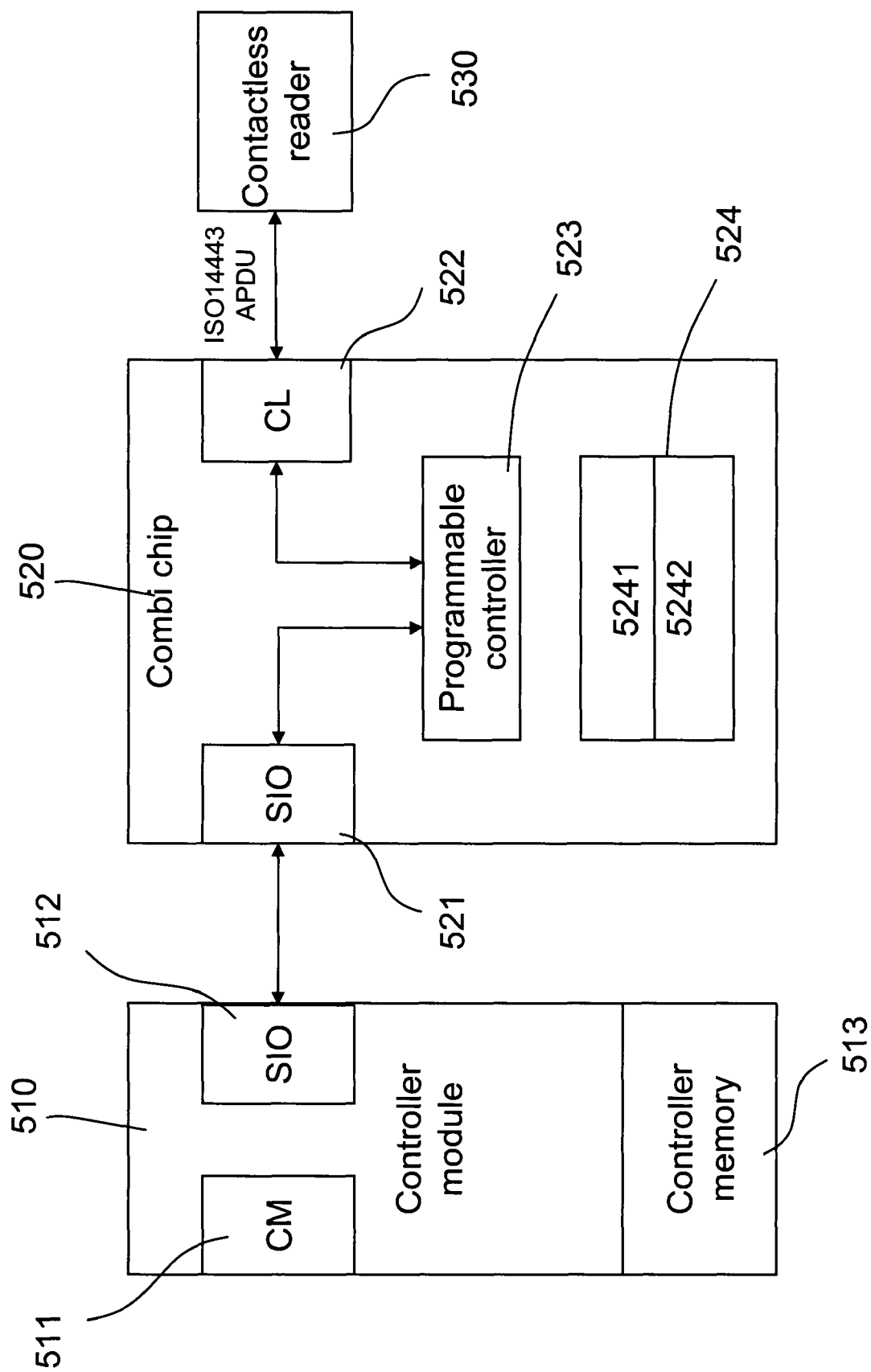
FIG. 6 illustrates an alternative implementation of the chipset incorporating a programmable controller in a wallet module according to the present invention.

Please refer to FIG. 6. It illustrates an alternative embodiment of the present invention if the optimized wallet module 310 illustrated in FIG. 4 is not available. In this embodiment, a controller module 510 and a conventional Combi chip (or a dual interface smart card chip) 520 that executes functions of the wallet module 310 by means of software are incorporated to implement the present invention. Similarly, the controller module 510 has a CM port 511 coupled to a SIM socket (not shown) in a mobile phone, a SIO 512 communicating with the Combi chip 520, and a controller memory 513. The Combi chip 520 includes a SIO port 521 and a CL port 522 coupled to a contactless reader 530, a programmable controller 523 for running controller software codes to operate the Combi chip 520, and a non-volatile memory 524 divided into a first area 5241 for storing wallet applications that is equivalent to the wallet memory 3164 in the wallet module 310 and a second area 5242 for storing the controller software codes. However, the programmable controller 523 built in the Combi chip 520 is rather high in both power consumption and IC cost. The controller module 510 connects to the Combi chip 520 by the SIO 512 which is typically a ISO-7816 UART. All units in the wallet module 310 of FIG. 4, such as the authentication/encryption unit 3162 and the command execution unit 3163 are now implemented by the controller software codes running on the programmable controller 523. Meanwhile, the controller module 510 now communicates with the Combi chip 520 using an API (Application Programming Interface) that is layered on top of ISO14443 or Mifare® APDU processing software running within the programmable controller 523. The APDUs transmitted on the SIO port 521 through the SIO 512 are designed for the API and are no longer in accordance with standard contactless protocols like ISO14443 or Mifare® chip.

Figure 7:
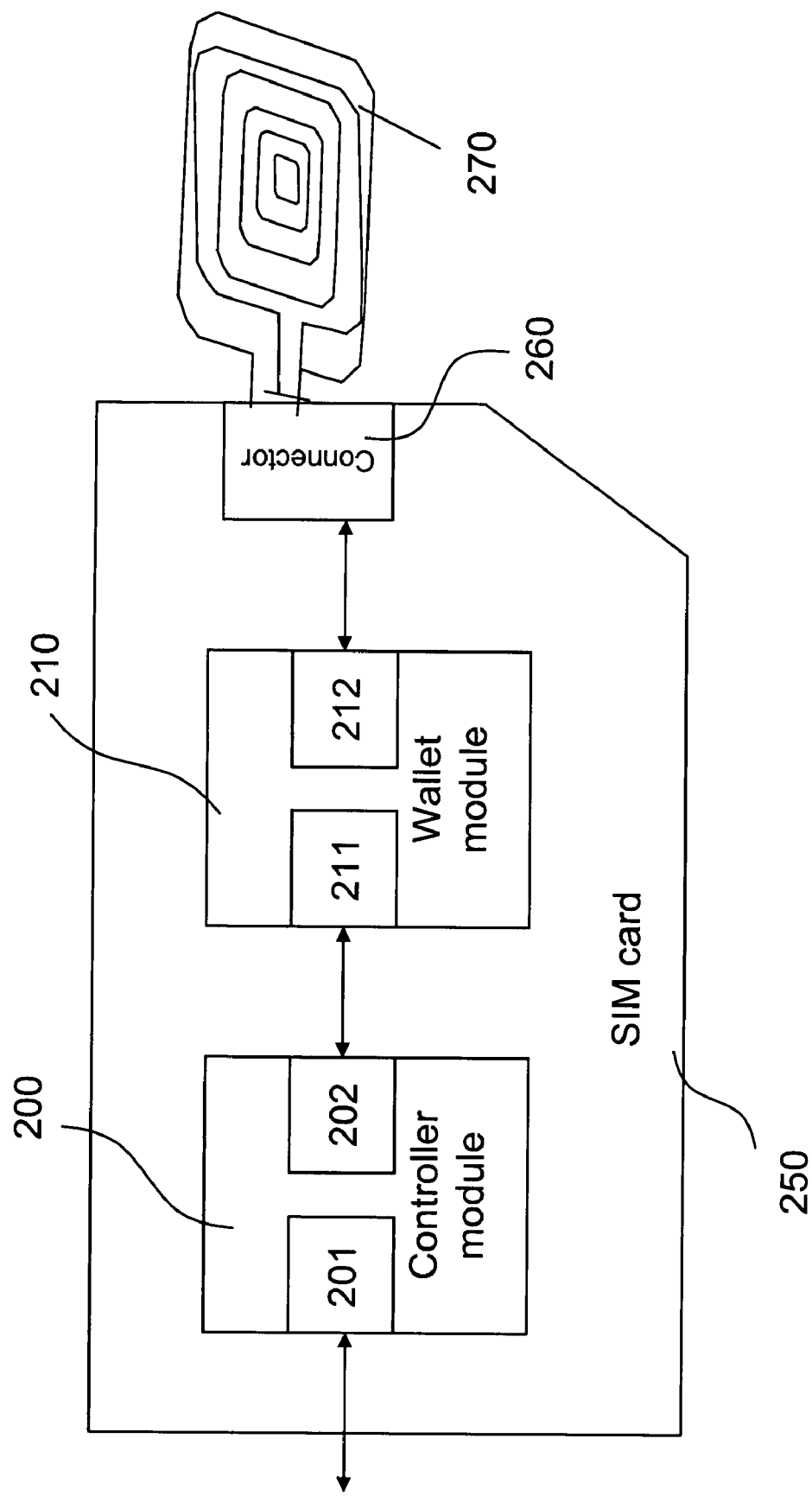
FIG. 7 illustrates the chipset residing in a SIM card according to the present invention.

Please refer to FIG. 7. It illustrates the chipset of FIG. 3 residing on a SIM card according to the present invention. The controller module 200 serves as a GSM (U)SIM controller, and thus resides within a SIM card 250, including a GSM SIM (Subscriber Identity Module) card, a GSM USIM (Universal SIM) card, a CDMA (Code Division Multiple Access) RUIM (Removable User Identity Module) card, a PHS (Personal Handy-phone System) SIM card, or other mobile communication ID cards that conform to GSM 11-11 standard form factor. The wallet module 210 resides on the same SIM card 250 as illustrated. The CL port 212 of the wallet module 210 connects to a connector 260 on the SIM card 250 where an RFID antenna 270 is attached. The antenna 270 constructed by a FPC (Flexible Printed Circuit Board) is preferred. The advantage is the low entry-cost for a mobile phone user to use mobile wallet functions by replacing a SIM card instead of obtaining a new mobile phone. It is to be noted that the SIM card shown in FIG. 7 represents a new kind of SIM card construction that contains 2 chips and connects to the antenna 270 constructed by FPC.

In conclusion, the present invention has great advantages over the prior arts. The concept of SIM card added with contactless interface that are vaguely described in quite many prior arts is now fully realized by the present invention. The chipset allows a practical implementation of mobile wallet system into a low cost SIM card. To enjoy the convenience brought by the mobile wallet system, users only need to pay for a new mobile wallet SIM card instead of a costly new mobile phone.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A chipset for a mobile wallet system in a communication terminal having a SIM socket and a RFID antenna in communication with a contactless reader, comprising:

a wallet module, coupled to the RFID antenna, having a contactless port and a first serial port for commands transmission, and a wallet memory for storing wallet applications; and a controller module, coupled to the SIM socket of the communication terminal, having a contact port and a second serial port for commands transmission, and a controller memory stored with SIM function software, mobile wallet application software and software for controlling the wallet module;

wherein the wallet module and the controller module are interconnected by the first serial port and the second serial port;

the controller module is powered through the SIM socket, and the wallet module is powered through the SIM socket and the RFID antenna;

the contactless port of the wallet module supports contactless protocols, while the second serial port of the controller module is supplied with a set of commands specific to the contactless protocols for execution by the wallet module; and wherein the wallet module further comprising a by pass unit for determining if a command from the contactless reader is one of the set of commands specific to the contactless protocol for execution by the wallet module, and for routing said command to the wallet module in the event the command is for execution by the wallet module and for routing the command to the controller module in the event the command is not in the set of commands specific to the contactless protocol for execution by the wallet module.

2. The chipset according to claim 1, wherein the wallet module further comprises a first I/O buffer for receiving commands from the controller module, and a second I/O buffer for holding commands from the contactless reader.

3. The chipset according to claim 2, wherein the wallet module further comprises a command arbitrator for selecting commands between the first I/O buffer and the second I/O buffer, and a command execution module for performing various operations in accordance with the selected commands.

4. The chipset according to claim 1, wherein the wallet module further comprises an authentication and encryption module for authenticating and encrypting the selected commands to secure communication with the contactless reader and the controller module.

5. The chipset according to claim 1, wherein the wallet module is implemented in hardwired logic.

6. The chipset according to claim 1, wherein the wallet memory is equally divided into a plurality of banks, and each bank has a capacity of 1 KB consisting of 16 sectors of 64 bytes.

7. The chipset according to claim 1, wherein the wallet memory is equally divided into a plurality of banks, wherein each bank has a capacity of 4 KB consisting of 64 sectors of 64 bytes.

8. The chipset according to claim 6 or 7, wherein the wallet module further comprises a non-volatile register that is loaded by the controller module with bank indexes for bank selection.

9. The chipset according to claim 1, wherein the mobile wallet system comprises mobile communication ID cards that conform to GSM11-11 standard form factor, including a GSM SIM (Subscriber Identity Module) card, a GSM USIM (Universal SIM) card, a CDMA (Code Division Multiple Access) RUIM (Removable User Identity Module) card, and a PHS (Personal Handy-phone System) SIM card.

10. A chipset for a mobile wallet system in a communication terminal having a SIM socket and a RFID antenna in communication with a contactless reader, comprising:

a wallet module, having a contactless port coupled to the RFID antenna for receiving commands from the contactless reader, a non-volatile memory divided into a first area for storing wallet applications and a second area for storing controller codes, and a programmable controller for executing the commands;

a controller module, connected to the SIM socket of the communication terminal, having a serial port for interfacing with the wallet module, and a controller memory stored with SIM function software, mobile wallet application software and software for controlling the wallet module;

wherein the controller module is powered through the SIM socket, and the wallet module is powered through the SIM socket and the RFID antenna; and wherein the wallet module further comprises a by-pass unit for determining if a command from the contactless reader is included in the designated set of commands, and for routing the command to the wallet module for execution if the command is included in the designated set of commands, and for routing the command to the controller module for execution if the command is not included in the designated set of commands.

11. The chipset according to claim 10, wherein a set of commands specific to the commands from the contactless reader are designated for execution in the wallet module.

12. The chipset according to claim 10, wherein the wallet module further comprises a first I/O buffer for receiving commands form the controller module, and a second I/O buffer for holding the commands from the contactless reader, and the first and the second I/O buffers are implemented by the controller codes executed on the programmable controller.

13. The chipset according to claim 12, wherein the wallet module further comprises a command arbitrator for selecting commands between the first I/O buffer and the second I/O buffer, and a command execution module for performing various operations in accordance with the selected commands, which are implemented by the controller codes executed on the programmable controller.

14. The chipset according to claim 10, wherein the wallet module further comprises an authentication and encryption module implemented by the controller codes executed on the programmable controller for securing communication with the contactless reader and the controller module.

15. The chipset according to claim 10, wherein the mobile wallet system comprises mobile communication ID cards that conform to GSM11-11 standard form factor, including a GSM SIM (Subscriber Identity Module) card, a GSM USIM (Universal SIM) card, a CDMA (Code Division Multiple Access) RUIM (Removable User Identity Module) card, and a PHS (Personal Handy-phone System) SIM card.

\* \* \* \* \*